United States Patent [19]

Fan et al.

[11] Patent Number: 4,963,373

[45] Date of Patent: Oct. 16, 1990

[54] R-T-E CEREAL COMPOSITION AND METHOD OF PREPARATION

[75] Inventors: Steve T. Fan, Maple Grove; William E. Koski, Minneapolis, both of Minn.

[73] Assignee: General Mills, Inc., Minneapolis, Minn.

[21] Appl. No.: 338,811

[22] Filed: Apr. 17, 1989

[51] Int. Cl.$^5$ .............................................. A21D 2/00
[52] U.S. Cl. ...................................... 426/74; 426/620; 426/621
[58] Field of Search .......................... 426/620, 621, 74

[56] References Cited

U.S. PATENT DOCUMENTS

| | | |
|---|---|---|
| 1,998,179 | 4/1935 | Wolf . |
| 2,824,008 | 2/1958 | Perri et al. . |
| 2,829,056 | 4/1958 | Kemmerer . |
| 3,514,296 | 5/1970 | Frank et al. . |
| 3,956,506 | 5/1976 | Cloud et al. ........................ 426/621 |
| 4,018,620 | 4/1977 | Penque . |
| 4,371,551 | 2/1983 | Fulger et al. . |
| 4,486,456 | 12/1984 | Thompson . |
| 4,637,835 | 1/1987 | Nagle . |
| 4,663,168 | 5/1987 | Von Fulger et al. . |

*Primary Examiner*—Donald E. Czaja
*Assistant Examiner*—Mary S. Mims
*Attorney, Agent, or Firm*—John A. O'Toole

[57] ABSTRACT

Disclosed are R-T-E cereal compositions of reduced salt content which nonetheless provide enhanced cooked cereal flavor. Also disclosed are methods for the preparation of such R-T-E cereals. The present methods comprise cooking a cereal to form a cooked cereal dough in the presence of sucrose and a water soluble calcium salt under conditions of elevated temperature and pressure for an extended cook. The combination of ingredients and cooking conditions provides cooked cereal dough and R-T-E cereals prepared therefrom which possess surprisingly increased levels of pyrazine flavor constituents.

49 Claims, No Drawings

R-T-E CEREAL COMPOSITION AND METHOD OF PREPARATION

1. Technical Field

The present invention relates to food products and to their methods of preparation. More particularly, the present invention relates to ready-to-eat ("R-T-E") cereals of improved flavor and reduced salt content and to their methods of preparation.

2. Background

Ready-to-eat cereals are well known and popular food items. Ready-to-eat cereals come in a wide variety of shapes, sizes, compositions, and flavors. Of long standing popularity are traditional R-T-E cereals including unpuffed products such as whole wheat flakes, or corn flakes, and puffed cereals, including oat based puffed Oh's. Traditionally, the products have been and are prepared by extended cook steps which develop flavorful, fully cooked cereal flavors. While popular, R-T-E cereals having a traditional, fully developed cereal flavor characteristic of long cooking, typically have high salt contents. The salt content not only is important to the cereal flavor development during the extended cooking step, but also, salt acts as a strong flavor potentiator in the finished cereal product.

Salt concentrations of from 2% to 4% have been typically used in the past for R-T-E cereal compositions. Due to the current health focus on sodium in the diet, however, present food industry trends have been to express salt content as milligrams sodium per ounce of product. In these units, a popular brand of traditional whole wheat flakes has in the past contained as much as 480 milligrams sodium per ounce of product.

Various efforts have been made over the years to reduce the sodium content of R-T-E cereals while nonetheless maintaining, insofar as possible, the desirable popular flavor of such products. Conventionally, such approaches have been to increase the cooking step, to add flavor precursors, to increase minor flavor constituents, e.g., malt, and the like. These approaches have met with some success in reducing the overall sodium content to about 300 milligrams sodium per ounce, while suffering some, but acceptable trade-offs with regard to flavor. Notwithstanding this success, there is a continuing need for new and improved methods for providing traditional, fully cooked or developed cereal flavor in cereal compositions which nonetheless have reduced or even more reduced sodium contents.

The recent past has seen a continuing development in food cooking apparatus and in particular, extruder cookers. These cooker extruders can rapidly cook or gelatinize cereal compositions. Typical cooking times can range from about 30 seconds to two minutes. As a result, cooker extruders are extremely interesting to food processors for cereal products. Indeed, cooker extruders are now used to prepare many R-T-E cereals. However, unfortunately, the cook step, due to its brevity, fails to develop the desirable, traditional, fully cooked cereal flavor. The cooked cereal composition produced by food extruders, while fully cooked in the sense that the starch has been gelatinized, nonetheless has a flavor that is variously described as "flat," "green," or "raw." In R-T-E cereals which are to be highly flavored or given flavors other than traditional cooked cereal flavors, this deficiency can be overcome. However, the utility of food extrusion would be greatly advanced if the flavor deficiencies can be overcome.

Surprisingly, the present invention provides cereal cooking methods and products resulting therefrom which have improved, traditional cooked cereal flavor while nonetheless employ lower sodium levels. In one embodiment of the present invention, the present methods comprise improvements in traditional, slow cook cereal cooking preparation. In another embodiment, the present invention provides methods for preparing a cooked cereal flavor concentrate which can be beneficially added to cereal composition ingredients for the rapid extruder cooking to realize rapidly cooked, extruder cooked cereal compositions which nonetheless provide the flavor of traditional, slow cooked cereal compositions.

SUMMARY OF THE INVENTION

The present invention relates to low salt R-T-E cereals which nonetheless exhibit high levels of cooked cereal flavor. In its method aspect, the present invention resides, in one embodiment, in cooking methods importantly employing a long cook, high pressure, high temperature cereal cooking step by which the present R-T-E cereal compositions can be prepared. In a second method embodiment, the present invention resides in the preparation of a flavor concentrate which can be added to a short cook extruder cereal cooking method for preparing the present R-T-E cereals.

DETAILED DESCRIPTION OF THE INVENTION

The present invention relates to improved R-T-E cereals of reduced salt content and to methods for their preparation. The present methods comprise the step of long cook, high pressure, high temperature cereal cooking in combination with sucrose and a water soluble calcium salt by which the present R-T-E cereal compositions and products can be prepared. Each of these process steps as well as R-T-E cereal composition are described in detail below.

Throughout the specification and claims, percentages are by weight and temperatures in degrees Fahrenheit unless otherwise indicated.

In the preferred embodiment, the first essential step of the present cooked cereal composition preparation method involves the preparation of an homogeneous blend of the cereal composition ingredients. Of course, the principal component of the present cereal composition is a starchy cereal component. The cereal component can comprise any conventionally employed starchy cereal or, synonymously, farinaceous material, for use in a ready-to-eat cereal. Exemplary suitable starchy cereals include cereal flours from wheat, rice, corn, oats, barley, rye or other cereal grains and mixtures thereof. The flours can be whole flours or flour fractions such as with the germ fraction or husk fraction removed. Of course, the R-T-E cereal art is well developed and the skilled artisan will have no difficulty selecting suitable farinaceous materials for use herein.

The starchy cereal component can comprise from about 60% to 75% (dry basis) of the homogeneous blend. For best results, the starchy cereal component comprises about 65% to 70%.

Still another essential component of the blend is common salt, sodium chloride. Conventionally, salt concentrations in the cooked cereal dough, when used for whole wheat flakes, for example, have in the past ranged from about 250 to 400 milligrams per ounce of dried R-T-E cereal. Generally, to achieve such salt concentrations in the finished product, the make-up cereal blend would comprise about 1.5% to 3.0% by weight sodium. In contrast, in the present invention, the blend essentially comprises from about 1.0% to 1.5% salt, preferably 1.2% to 1.4%. For best results in terms of sodium ion concentration reduction balanced with flavor, the salt content should be about 1.4%.

Of course, specific salt concentrations within the above-described essential ranges will be modified and selected, in view of the end product attributes desired, as well as the farinaceous material(s) employed. Generally, however, the salt concentrations employed herein are about 25% to 50% less than the salt levels which would otherwise be conventionally employed. Further, suitable selected salt concentrations will be modestly influenced by the finishing steps of flaking, puffing, etc. which are selected. Of course, the blend can additionally comprise modest amounts of sodium chloride substitutes or replacers such as potassium chloride. However, potassium chloride imparts to cereals a taste which some consumers find objectionably metallic. Thus, in preferred embodiments, the blend is substantially free of such salt substitutes (i.e., no potassium chloride is added).

The blend additionally essentially comprises sucrose and a calcium ion source, each in defined amounts. The present invention resides in part upon the surprising discovery that cereal compositions can be prepared having reduced salt content but nonetheless equivalent or even enhanced cooked cereal flavor when the cereal component is cooked in an aqueous solution comprising sucrose and calcium ion source. During the cook step, the calcium salt apparently catalytically assists the conversion of sucrose into the constituent sugars of fructose and glucose.

Of course, the hydrolyzation of sucrose into its two constituent monosaccharides, glucose and fructose, is well known. This hydrolysis is frequently termed "inversion," a name that is derived from the change in optical rotation of the sugar solution. This hydrolysis is accomplished in an acidic solution which is affected by both time and temperature. Also known are various enzymes referred to as invertase which are also used for this inversion.

The development of cooked cereal flavor is an extremely complex phenomenon. While the precise chemical pathways for cooked cereal flavor development are not fully understood, it has been surprisingly discovered that these pathways are apparently facilitated while sucrose inversion is simultaneously occurring. Moreover, the inversion process in the present cereal cooking step has been surprisingly discovered to be calcium ion catalyzed. Applicants have also surprisingly discovered that the mere addition of fructose and/or glucose in substitution for the inversion reaction products does not equivalently facilitate the improved cooked cereal flavor production. Apparently more is involved in the chemical pathways for cooked cereal flavor development than mere sucrose inversion.

Applicants have further surprisingly discovered that other sucrose inversion techniques, namely acid hydrolysis and enzyme hydrolysis, similarly cannot be substituted for the calcium ion sucrose hydrolysis reaction occurring during the to-be-described cooking step. Indeed, the pH of the cooked solution initially desirably ranges from about 6 to 7. That is, the low pH conditions facilitating acid inversion of sucrose are to be avoided herein although, as the to-be-described cooking step proceeds, a decrease in pH is observed.

Thus, it is essential that the precook blends comprise about 6% to 12% by weight sucrose. Preferably, the blends comprise about 7% to 9% sucrose and for best results, about 9%. Sucrose concentrations within the higher end of the above described range generally are preferred when the cooking step is relatively shorter. Conversely, for longer cook times, the sucrose concentrations selected can be relatively lower.

If desired, other supplemental nutritive carbohydrate sweeteners can be additionally included into the blend. Such sweeteners can comprise, for example, fructose, glucose, corn syrup, honey, maple syrup solids, fruit juice solids, and mixtures thereof. If present, such nutritive carbohydrate sweeteners can collectively comprise about 0.1% to 10% of the precook blend.

The blend essentially comprises sufficient amounts of a water soluble calcium salt so as to provide the blend with a calcium ion concentration ranging from about 0.05% to 0.2%, preferably 0.05% to 0.1%. Suitable calcium ion sources include any commonly used edible water soluble calcium salts. By water solubility herein is meant a solubility in room temperature water of at least about 3%. Exemplary water soluble calcium salts include calcium chloride, calcium citrate, calcium lactate, calcium oxide, calcium sulfate (dihydrate) and mixtures thereof. Preferred for use herein is calcium chloride. However, certain calcium salts will not catalyze the hydrolysis of sucrose, such as tricalcium phosphate, which, it is believed is not sufficiently water soluble and which has a water solubility of less than 3%.

The present cereal compositions can additionally comprise a variety of other minor ingredients intended to make the cereal compositions nutritionally, organoleptically or visually appealing. Such materials can include, for example, vitamins, mineral fortifiers, colors, and flavors. If present, these materials can each comprise from about 0.1% to 2% by weight of the composition. Especially preferred for use herein is trisodium phosphate ("TSP") which serves as a pH buffering agent. Useful concentrations of TSP range from about 0.1% to 0.5%.

Another essential component of the blend is sufficient amounts of water, such that upon completion of the cooking step, adequate moisture is present to gelatinize and hydrate the starch component of the farinaceous material. Useful amounts of water essentially range from about 18% to 25% by weight of the homogeneous blend so as to achieve approximately these concentrations of moisture in the cooked cereal. Modest adjustments to the water addition are to be made in known manner, in view of any moisture gain from steam condensation occasioned by cooking. Better results are obtained when the water comprises about 21% to 23% to achieve a cooked cereal dough of such moisture content.

Thereafter, the homogeneous blend is essentially cooked at conditions of elevated temperature and pressure to gelatinize the starchy component of the farinaceous material and to develop the cooked cereal flavor components herein. The desirably high cooked cereal flavor is generally due to the presence of various pyrazine and pyrazine derivative compounds.

During the cook step, the sucrose hydrolysis reaction also takes place. The cook step is continued until the fructose concentration in the cooked dough increases about 1% to 2% from starting concentrations even though starch gelatinization may have been earlier completed.

Of course, useful cooking methods for cooking cereals include several different categories including boiling water cookers, steam cookers, low shear high pressure extruders, low shear low pressure cookers, adiabatic extruders, high shear extruders, and high shear extruders with steam precookers (sometimes called conditioners). Broadly, these different categories, however, can be divided into short cook systems, e.g., 15 seconds to three minutes, and long cook cookers, e.g., 30 minutes to eight hours. Inasmuch as the cooking step must be continued for times sufficient to achieve minimum flavor (pyrazine concentrations) the present method essentially comprises long term cooking methods. These long term cooking methods include boiling water cookers, steam cookers (operated at lower steam pressures) and high shear extruders but with steam precookers.

However, it is also essential that the cooking step be practiced with high temperatures achievable only under high pressure. Preferred for use herein are steam cookers and high shear extruders with steam precookers. When steam cookers are employed, the steam pressures typically range from about 15 to 30 psig and cook times are considerably shortened, ranging from about 0.5 to 1.5 hours. When high shear extruders with steam precookers are employed, the blend remains in the precooker or conditioner for about 0.5 to 1.0 hours at a steam pressure of about 10 to 15 psig prior to finish cooking in the extruder. Useful cooking temperatures essentially range from about 250° to 300° F. (121° to 149° C.).

Thereafter, the cooked cereal dough so realized characterized by a lower salt concentration but with enhanced overall flavor can be subsequently processed in conventional manner in order to realize the present R-T-E cereals. The post cooking processing of cooked cereal doughs can vary widely depending on the desired R-T-E cereal. In one highly preferred embodiment of the present invention, the cooked cereal dough prepared as described above is subsequently extruded employing a low pressure extruder into a pelletizer. The pelletizer fabricates pellets characterized by a moisture content of about 26% to 30%. The size of pellets can vary and generally range from about 40 to 60, preferably 45 to 50 per 10g. The pellets are then dried in a dryer at temperatures ranging from 150° to 200° F. and reduced moisture to a range of 18% to 23%. The dried pellets were fed to a flaking roll wherein they are reduced to a thickness ranging from about 0.08 to 0.10 inches. Thereafter, the flakes are then toasted in a toaster (e.g., a jet zone heater) which simultaneously reduces the moisture content to about 1% to 3%, provides a toasted flavor and partially expands the product to improve its texture and other organoleptic attributes. The desirable cooked cereal and toasted flavors are fully developed in the toaster. The flavors are generally attributable to the presence of pyrazines and other volatile compounds. Examples of pyrazines found in the flaked cereals are:

Pyrazine
2-methyl pyrazine
2,3-dimethyl pyrazine
2,5-dimethyl pyrazine
2,6-dimethyl pyrazine
ethyl pyrazine
2-ethyl 5-methyl pyrazine
2-ethyl 6-methyl pyrazine
2-ethyl 3-methyl pyrazine
2-ethyl 3,5-dimethyl pyrazine
2-ethyl 3,6-dimethyl pyrazine
tetramethyl pyrazine.

The R-T-E cereal prepared as described above can either be packaged or optionally can be coated with either a sugar coating and/or vitamin coating.

The R-T-E cereals of the present invention prepared according to the above described method of preparation are thus essentially characterized by a fructose concentration resulting from sucrose inversion ranging from about 1% to 2%. The R-T-E cereals are additionally further essentially characterized by a glucose concentration also ranging from about 1% to 2%. The sucrose concentration of the present R-T-E cereals range from about 6% to 10% reflecting a reduction in sucrose concentration from the starting blend concentration of about 2% to 4%. The calcium ion concentration ranges from about 0.1% to 0.5%. The R-T-E cereals are additionally further essentially characterized by a pyrazine concentration ranging from about 5 to 15 ppm (measured by gas chromatic graph-nitrogen specific detector). The R-T-E cereals can also be further characterized by the total volatiles of the R-T-E cereal (measured by gas chromatic graph flame ionization to 2-heptanone as an internal standard) ranging from about 200 to 300 ppm.

As indicated above, the above-described embodiment is suitable for use in connection with slow cooking, high pressure, high temperature cooking methods and apparatus. In another embodiment of the present invention, however, fast cooking cereal cooking methods and apparatus can be employed. In this embodiment, however, a variation is used wherein a flavor syrup is first prepared and then admixed to a mixture of the farinaceous material and water. Thereafter, the flavor concentrate and cereal/water mixture is finish cooked in a short residence time cereal cooker to realize a cooked cereal dough of enhanced flavor but reduced salt content. The so prepared cereal dough can be finish processed as described above.

The flavor syrup is prepared by first admixing to form an aqueous solution of about 20% to 30% (wet basis) sucrose, 2% to 4% salt (preferably about 2% to 3% salt), 0.3% to 0.9% of a calcium ion moiety. Additionally, the flavor solution can comprise about 3% to 5% of a malt syrup. By malt syrup is meant a mildly flavored enzyme converted, non-diastatic malt syrup prepared from a concentrated aqueous extract of malted barley and/or corn. Typically, the malt syrup contains 57% to 62% maltose, 3% to 6% protein, with pH normally in the range of 4.8 to 5.4. Additionally, the flavor syrup requires a nitrogen source. Conveniently and preferably, the nitrogen source can be a cereal germ fraction such as corn germ, wheat germ, barley germ, oat germ, and mixtures thereof. Additionally suitable for the nitrogen source are such materials as peanut flour, sesame flour, soybean flour, wheat gluten, Zein (a corn protein) and pea flours. Such chemicals as ammonium bicarbonate, ammonia, and ammonium carbonate are good nitrogen sources. While useful, these materials are less preferred. The solution essentially comprises about 5% to 15%, preferably 8% to 12% of the nitrogen source material. Most preferred for use herein as nitrogen source materials in the flavor syrup are corn germ, wheat germ, wheat gluten and mixtures thereof.

The flavor syrup is then cooked at a temperature of about 250° to 300° F. for about 0.5 to 1.5 hours in order to prepare the present flavor syrup and to hydrolyze about 1% to 2% of the sucrose therein. Preferably, the flavor syrup cook is also conducted under conditions of high pressure, e.g., 5-30 psig.

Thereafter, the flavor syrup so formed is combined with a mixture of cereal or other farinaceous material and water and cooked in a fast cooking cook step. As indicated above, fast cooking apparatus and methods include low shear high pressure extruders, low shear low pressure cookers, adiabatic extruders, and high shear extruders. Preferred for use herein are high shear extruders such as single screw extruders or twin screw extruders. Cook times can range from as short as a few seconds up to a few minutes in order to gelatinize the starch component of the farinaceous material. Cooked dough moisture contents within common ranges, e.g., 10% to 40%, can be employed.

The flavor syrup is used in a weight ratio of concentrate to cereal blend (dry basis) ranging from about 10-50:100, preferably for best flavor at about 25-50:100, e.g., 50 parts of flavor syrup to 100 parts of dry cereal blend. In very low sodium embodiments of acceptable flavor, the flavor syrup comprises about 2% salt and is used at about 10 parts syrup to 100 parts cereal. In this example, most or all of the moisture for the cereal dough is supplied by the water of the flavor syrup. Thereafter, as indicated above, the combination is rapidly cooked to prepare a cooked cereal dough but characterized by high flavor constituent concentrations and fully cooked and hydrated cereal starch. The high flavor, low salt, cooked cereal dough so prepared, as indicated above, can be conventionally processed to prepare the present improved R-T-E cereals.

The present cereal compositions can be fabricated into any of a variety of common R-T-E cereal forms including, shreds, biscuits, flakes, or any common R-T-E cereal form. The present cereal compositions can also be formulated and fabricated so as to provide puffed cereals of various shapes and sizes. Especially desirable for use herein are flakes, especially toasted flakes.

If desired, the present cereal compositions can be fabricated into presweetened R-T-E cereals such as by the topical applications of a conventional sweetener coating. Both conventional sugar coatings and coatings employing high potency sweeteners, especially aspartame and potassium acesulfame, are known and can be used to provide presweetened cereal for use herein.

The R-T-E cereal pieces so fabricated have relatively low water activities ranging typically from about 0.1 to 0.15 reflecting moisture content ranging from about 1% to 4%.

Without further elaboration, it is believed that one skilled in the art can, using the preceding description, utilize the present invention to its fullest extent. The following preferred specific embodiments are, therefore, to be construed as merely illustrative and limitative of the remainder of the disclosure. It will be appreciated that other modifications of the present invention, within the skill of those in the R-T-E cereal art, can be undertaken without departing from the spirit and scope of the invention.

Example 1

A whole wheat flake R-T-E cereal of reduced salt concentration is made according to the following procedure:

A syrup was first formed by admixing sugar (3.5 lbs), salt (0.65 lb), calcium chloride (0.07 lb), malt syrup (1 lb), and water (12 lbs) into a homogeneous blend. The pH was adjusted to 6.5. The syrup was introduced into a pressure cooker. Wheat (32 lbs) was added to the cooker. The mixture was cooked under pressure (18 to 25 psig) for 50 to 70 minutes at a temperature of about 270° F. until the dough was fully cooked. The cooked cereal dough was extruded with a forming extruder to make pellets approximately 5/32 inch in diameter and ½ inch in length. The pellets were dried to a moisture content of between 20% to 23%. A flaking roll was then used to flake the pellets. Thereafter, the flakes were toasted at a temperature between 350° to 400° F. to a walnut brown color.

The finished flake R-T-E product had a fully developed cooked wheat flavor along with a sweet, toasting flavor. Chemical analysis of the flakes provided the following results:

| | |
|---|---|
| sucrose | 7.2% |
| fructose | 1.6% |
| glucose | 1.4% |
| color Agtron 28 (with Agtron calibrated to 8 using #24 disk and 98 using #75 disk) | |
| total pyrazine | 10 ppm |
| total volatiles | 234 ppm |
| sodium | 650 mg/100 g |

Example 2

A corn flake R-T-E cereal of reduced sodium content is made according to the same procedure as described above.

The syrup was blended by mixing sugar (3 lbs), salt (1 lb), calcium chloride (0.1 lb), high fructose corn syrup (0.5 lb), malt syrup (0.5 lb), and water (10 lbs). Defatted corn grits were added to the cooker along with the syrup. The mixture was cooked, extruded, dried, flaked, and toasted as described in Example 1. The finished flake produced had a golden brown color with well developed cooked corn and toasted flavors.

Chemical analysis of the corn flakes provided the following:

| | |
|---|---|
| sucrose | 6.0% |
| fructose | 1.3% |
| glucose | 1.2% |
| total pyrazines | 14 ppm |
| total volatiles | 300 ppm |
| sodium | 700 mg/100 g |

Example 3

A flavor syrup was prepared by mixing 25 lbs sucrose, 3 lbs salt, 4 lbs malt syrup, 0.2 lb trisodium phosphate, 4 lbs calcium chloride, 10 lbs corn germ, and 20 lbs water in a ribbon blender. The mixture was cooked in a high pressure cooker at a temperature of 270° F. for 70 minutes. After cooking, the syrup was removed from the cooker and put aside for future use as cereal flavoring syrup.

To prepare reduced sodium, enhanced flavor corn cereal, 1 part flavor syrup was fed into an extruder along with 2 parts corn meal and 1 part water. The conditions of the extruder were: feed rate 10 lb/min.; extruder rpm 39; steam jacket pressure 28 psi; extruder temperature 220° F. Pellets came out of the extruder which had the size of 60-70 counts per 10g weight. The moisture content of the extruded pellets was 22% to 24%. The pellets were fed into a flaking roll and flaked to a thickness of 0.10 inch and sent to a toaster (Jet Zone heater). The toasting temperature ranged from 375° to 400° F. and toasting time was approximately 5 minutes. The finished flake produced had a golden brown color with well developed cooked corn and toasted flavors.

Chemical analysis of the corn flakes showed similar results to the flakes produced in Example 2.

What is claimed is:

1. A method for preparing a cooked cereal composition of low salt content which nonetheless has a good cooked cereal flavor in a high temperature, high pressure long cook process, comprising the steps of:
   A. admixing to form an homogeneous blend of
      1. about 60% to 75% by weight of the blend of a farinaceous material having a starchy component,
      2. about 6% to 12% by weight of the blend of sucrose,
      3. about 1.0% to 1.5% by weight of the blend of sodium chloride,
      4. sufficient amounts of a water soluble calcium salt to provide calcium ion concentration ranging from about 0.05% to 0.2% of the blend said calcium salt having a water solubility of at least 3% by weight, and
      5. about 18% to 25% by weight of the blend of water, said blend having a pH ranging from about 6 to 7 and an initial fructose concentration;
   B. cooking the blend at conditions of elevated temperature by using superheated steam at a pressure of 15 to 30 psig for a period of about 0.5 to 1.5 hours while hydrolyzing sucrose to form a cooked cereal dough having a fructose concentration of about 1% to 2% greater than the initial fructose concentration;
   C. forming the cooked cereal dough into pieces of desired shape and size; and
   D. drying the pieces to form a ready-to-eat cereal.

2. The method of claim 1 wherein in Step A, the blend comprises a water soluble salt selected from the group consisting of calcium chloride, calcium citrate, calcium lactate, calcium oxide, calcium sulfate (dihydrate), and mixtures thereof.

3. The method of claim 2 wherein in Step A, the blend comprises
   1. about 65% to 75% by weight of the blend of the farinaceous material,
   2. about 7% to 9% by weight of the blend of sucrose,
   3. a calcium ion concentration of about 0.05% to 0.1%.

4. The method of claim 3 wherein the Step C, the method comprises the substeps of:
   forming the dough into pellets, flaking the pellets into flakes, and toasting the flakes to form dried, toasted ready-to-eat cereal flakes.

5. The method of claim 4 wherein the dried, toasted ready-to-eat cereal flakes have a total pyrazine concentration of about 5 to 15 ppm.

6. A method for preparing a cooked cereal composition of low salt content which nonetheless has a good cooked cereal flavor in a short cook process, comprising the steps of:
   A. Forming a cooked cereal reaction flavor concentrate by cooking an aqueous flavor concentrate precursor blend comprising
      1. about 20% to 30% by weight of the blend of sucrose,
      2. about 2% to 4% by weight of the blend of sodium chloride,
      3. sufficient amounts of a water soluble calcium salt to provide a calcium ion concentration ranging from about 0.3% to 0.9% said calcium salt having a water solubility of at least 3% by weight,
      4. about 5% to 15% by weight of the blend of a nitrogen source wherein the precursor blend comprises a nitrogen food source material selected from the group consisting of peanut flour, corn germ, what germ, barley germ, oat germ, sesame flour, soybean flour, wheat gluten, zein, pea flour, ammonium bicarbonate, ammonia, ammonium carbonate, and mixtures thereof, and the balance of the blend of water, said precursor blend having a pH of about 6 to 7 and an initial fructose concentration, at a temperature of about 250° to 300° F. at a pressure of about 15 to 30 psig for about 0.5 1.5 hours to form a cooked cereal flavor concentrate having a fructose concentration of about 1% to 5% greater than the initial fructose concentration;
   B. extruder cooking a mixture of a farinaceous material and water under conditions of heat and pressure to gelatinize the starch component of the farinaceous material while feeding the cooked cereal flavor concentrate to the mixture in a weight ratio of concentrate to farinaceous material on a dry basis of from about 10-50:100 for about 3 for 120 seconds to form a cooked cereal dough of enhanced cooked cereal flavor and reduced salt content;
   C. forming the cooked cereal dough into pieces of desired shape and size; and
   D. drying the pieces to form ready-to-eat cereals.

7. The method of claim 6 wherein the precursor blend comprises a water soluble salt selected from the group consisting of calcium chloride, calcium citrate, calcium lactate, calcium oxide, calcium sulfate (dihydrate), and mixtures thereof.

8. The method of claim 7 wherein the precursor blend additionally comprises:
   5. about 3% to 5% by weight of the blend of a malt syrup.

9. The method of claim 8 wherein the precursor blend comprises a nitrogen food source material selected from the group consisting of corn germ, wheat germ, barley germ, oat germ, and mixtures thereof.

10. The method of claim 9 wherein in the precursor blend the water soluble calcium salt is calcium chloride.

11. The method of claim 10 wherein the precursor blend comprises wheat germ as the nitrogen source material.

12. The method of claim 11 wherein the farinaceous material comprises about 70% to 90% by weight of the mixture, and wherein in Step C, the method comprises the substeps of:
   forming the cooked cereal dough into pellets, flaking the pellets to form flakes,
toasting the flakes to form dried, ready-to-eat cereal flakes.

13. The method of claim 12 wherein the dried, toasted ready-to-eat cereal flakes have a total pyrazine concentration of about 5 to 15 ppm.

14. A dry, R-T-E cereal composition of superior flavor, comprising:
   A. about 80% to 90% by weight of the composition of a farinaceous component;
   B. about 1% to 2% by weight of the composition of fructose;
   C. about 1% to 2% by weight of the composition of glucose;
   D. about 6% to 9% by weight of the composition of sucrose;
   E. about 0.05% to 0.1% by weight of the composition of a calcium ion;
   F. about 10 ppm to 20 ppm by weight of the composition of pyrazines;
   G. about 1% to 3% by weight of the composition of sodium chloride; and
   H. about 200 ppm to 400 ppm total volatiles.

15. The product prepared according to the method of claim 1 wherein in Step A, the blend comprises a water soluble salt selected from the group consisting of calcium chloride, calcium citrate, calcium lactate, calcium oxide, calcium sulfate (dihydrate), and mixtures thereof.

16. The product prepared according to the method of claim 2 wherein in Step A, the blend comprises
   1. about 65% to 75% by weight of the blend of the farinaceous material,
   2. about 7% to 9% by weight of the blend of sucrose,
   3. a calcium ion concentration of about 0.05% to 0.1%.

17. The product prepared according to the method of claim 3.

18. The product prepared according to the method of claim 4.

19. The product prepared according to the method of claim 5.

20. The product prepared according to the method of claim 6.

21. The product prepared according to the method of claim 7.

22. The product prepared according to the method of, claim 8.

23. The product prepared according to the method of claim 9.

24. The product prepared according to the method of claim 10.

25. The product prepared according to the method of claim 11.

26. The product prepared according to the method of claim 12.

27. The product prepared according to the method of claim 13.

28. The method of claim 3 wherein the homogeneous blend additionally comprises:
   6. about 1% to 10% of a supplemental nutritive carbohydrate sweetening agent.

29. The method of claim 28 wherein the farinaceous material includes wheat.

30. The method of claim 29 wherein the water soluble salt is calcium chloride.

31. The method of claim 30 wherein the homogeneous blend additionally comprises:
   7. about 0.1% to 0.5% trisodium phosphate.

32. The product prepared according to the method of claim 30.

33. The product prepared according to the method of claim 31.

34. The method of claim 9 wherein the homogeneous blend additionally comprises:
   6. about 1% to 10% of a supplemental nutritive carbohydrate sweetening agent.

35. The method of claim 34 wherein the homogeneous blend has a pH ranging from about 6 to 7.

36. The method of claim 35 wherein the water soluble salt is calcium chloride.

37. The method of claim 36 wherein the homogeneous blend additionally comprises:
   7. about 0.1% to 0.5% trisodium phosphate.

38. The product prepared according to the method of claim 36.

39. The product prepared according to the method of claim 37.

40. A method for preparing a cooked cereal reaction flavor concentrate useful in the preparation of a cooked cereal product, comprising the steps of:
   A. forming an aqueous flavor concentrate precursor blend comprising
      1. about 20% to 30% by weight of the blend of sucrose,
      2. about 2% to 4% by weight of the blend of sodium chloride,
      3. sufficient amounts of a water soluble calcium salt to provide a calcium ion concentration ranging from about 0.3% to 0.9%, said calcium salt having a water solubility of at least 3% by weight,
      4. about 5% to 15; % by weight of the blend of a nitrogen source selected from the group consisting of peanut flour, corn germ, wheat germ, barley germ, oat germ, sesame flour, soybean flour, wheat gluten, zein, pea flour, ammonium bicarbonate, ammonia, ammonium carbonate, and mixtures thereof, and the balance of the blend of water, said precursor blend having a pH of about 6 to 7 and an initial fructose concentration; and
   B. cooking the precursor blend at a temperature of about 250° to 300° F. at a pressure of about 15 to 30 psig for about 0.5 to 1.5 hours to form a cooked cereal flavor concentrate having a fructose concentration of about 1% to 5% greater than the initial fructose concentration.

41. The method of claim 40 wherein the precursor blend comprises a water soluble salt selected from the group consisting of calcium chloride, calcium citrate, calcium lactate, calcium oxide, calcium sulfate (dihydrate), and mixtures thereof.

42. The method of claim 41 wherein the precursor blend additionally comprises:
   5. about 3% to 5% by weight of the blend of a malt syrup.

43. The method of claim 42 wherein the precursor blend comprises a nitrogen food source material selected from the group consisting of corn germ, wheat germ, barley germ, oat germ, and mixtures thereof.

44. The method of claim 43 wherein in the precursor blend the water soluble calcium slat is calcium chloride.

45. The method of claim 44 wherein the precursor blend comprises wheat germ as the nitrogen source material.

46. The method of claim 45 wherein the farinaceous material comprises about 70% to 90% by weight of the mixture.

47. The product prepared according to the method of claim 42.

48. The product prepared according to the method of claim 44.

49. The product prepared according to the method of claim 46.

* * * * *

UNITED STATES PATENT AND TRADEMARK OFFICE
CERTIFICATE OF CORRECTION

PATENT NO. : 4,963,373
DATED : October 16, 1990
INVENTOR(S) : Steve T. Fan and William E. Koski It is certified that error appears in the above-identified patent and that said Letters Patent is hereby corrected as shown below:

Col. 9, line 61 - "the Step" should be -- in Step --.

Col. 10, line 20 - "what germ" should be -- wheat germ --.

Col. 10, line 29 - "0.5 1.5" should be -- 0.5 to 1.5 --.

Col. 10, line 38 - "3 for" should be -- 3 to --.

Col. 12, line 36 - "15;%" should be -- 15% --.

Col. 12, line 66 - "slat" should be -- salt --.

Signed and Sealed this

Seventh Day of July, 1992

Attest:

DOUGLAS B. COMER

*Attesting Officer*         *Acting Commissioner of Patents and Trademarks*